United States Patent
Lin et al.

(10) Patent No.: US 7,999,028 B2
(45) Date of Patent: *Aug. 16, 2011

(54) METHOD FOR FAST DISPERSING CARBON NANOTUBE IN AQUEOUS SOLUTION

(75) Inventors: Kuan-Jiuh Lin, Taichung (TW); Jun-Wei Su, Chia-Yi (TW)

(73) Assignee: Kuan-Jiuh Lin, Taichung (TW)

( * ) Notice: Subject to any disclaimer, the term of this patent is extended or adjusted under 35 U.S.C. 154(b) by 157 days.

This patent is subject to a terminal disclaimer.

(21) Appl. No.: 11/472,951

(22) Filed: Jun. 21, 2006

(65) Prior Publication Data
US 2010/0227409 A1 Sep. 9, 2010

(30) Foreign Application Priority Data
Jun. 23, 2005 (TW) .............................. 94120961 A

(51) Int. Cl.
- C08K 7/03 (2006.01)
- C08K 3/04 (2006.01)
- B01J 8/16 (2006.01)
- B82Y 35/00 (2006.01)
- C01B 31/00 (2006.01)

(52) U.S. Cl. ........ 524/496; 524/495; 977/734; 977/742; 977/750; 977/752

(58) Field of Classification Search .................. 524/495, 524/494, 496; 252/500; 977/734, 742, 750, 977/752
See application file for complete search history.

(56) References Cited

U.S. PATENT DOCUMENTS
| | | | |
|---|---|---|---|
| 2002/0113335 A1* | 8/2002 | Lobovsky et al. | 264/184 |
| 2003/0077515 A1* | 4/2003 | Chen et al. | 429/231.8 |
| 2003/0102585 A1* | 6/2003 | Poulin et al. | 264/11 |
| 2007/0067881 A1* | 3/2007 | Lin et al. | 977/742 |

OTHER PUBLICATIONS

Jiang, Lindquin, Lian Gao, and Jing Sun. (2003) Production of aqueous colloidal dispersions of carbon nanotubes. Journal of Colloid and Interface Science, vol. 260, pp. 89-94.*
Rozhin, Aleksey G, Youichi Sakakibara, Madoka Tokumoto, Hiromichi Kataura and Yohji Achiba. (Oct. 11, 2004) Near-infrared nonlinear optical properties of single-wall carbon nanotubes embedded in polymer film. Thin Solid Films, vol. 464-465, p. 268-372.*
Islam, M. F., E. Rojas, D. M. Bergey, A. T. Johnson, and A. G. Yodh. (2003) High Weight Fraction Surfactant Solubilization of Single-Wall Carbon Nanotubes in Water. Nano Letters, vol. 3 (2), p. 269-273.*
Sigma-Aldrich Product Website. (http://www.sigmaaldrich.com/Area_of_Interest/The_Americas/United_States.html) Provided: the results of a search for SDS product.*
Feinstein, Robert N. and William R. Cole. (1973) "Simple Device for Positioning Small Test Tubes in an Ultrasonicator" Analytical Biochemistry, vol. 54, pp. 310-312.*
Branson 350 Product Details (1997) HiTechTrader.com Item #: 006020903, Online at: http://www.hitechtrader.com/detail.cfm?autonumber=22052.*

* cited by examiner

*Primary Examiner* — Milton I Cano
*Assistant Examiner* — Darcy D LaClair
(74) *Attorney, Agent, or Firm* — Charles E. Baxley

(57) ABSTRACT

The present invention provides a method for fast dispersing carbon nanotubes in an aqueous solution. In this method, the carbon nanotubes are added into an aqueous solution of a nontoxic surfactant, and then dispersed therein through ultrasonic oscillation. This uniform dispersion can maintain high stability for at least two months without aggregation, suspension or precipitation. This dispersion is suitable for calibrating concentration of the carbon nanotubes.

6 Claims, 7 Drawing Sheets

METHOD FOR FAST DISPERSING CARBON NANOTUBE IN AQUEOUS SOLUTION

BACKGROUND OF THE INVENTION

1. Field of the Invention

The present invention relates to a method for dispersing carbon nanotubes (CNT), and particularly in an aqueous solution. The present invention also relates to a dispersion obtained via this method, which serves as an agent for calibrating concentration of carbon nanotubes.

2. Related Prior Arts

Conventionally, to reinforce mechanical strength, thermal stability and durability of plastic material, additives such as ceramics, metal, carbon fibers, active carbon, etc., are added therein. However, it's difficult to well disperse the additives in plastic. As a novel material with superior characteristics, carbon nanotubes are widely applied to processing of various industries. However, it's still a problem to disperse the carbon nanotubes in a matrix.

Due to the curled graphite structure, lots of resonant it electrons and huge molecular weight, the carbon nanotubes are hardly soluble in water or other organic solvents. In some reports as follows, surfactants, organic solvents, strong acids, strong base and high temperature are applied to promoting dispersion of the carbon nanotubes.

(1) Amphoteric polymeric surfactant: the dispersion can last four days. (Vladimir A. Sinani, Muhammed K. Gheith, Alexander A. Yaroslavov, Anna A. Rakhnyanskaya, Kai Sun,| Arif A. Mamedov, James P. Wicksted, and Nicholas A. Kotov, Aqueous Dispersions of Single-wall and Multi-wall Carbon Nanotubes with Designed Amphiphilic Polycations J. AM. CHEM. SOC. 2005, 127, 3463-3472)

(2) Poly(4-vinylpyridine) (P4VP): the CNT/alcohol dispersion can last 1~6 weeks. (Jason H. Rouse Polymer-Assisted Dispersion of Single-Walled Carbon Nanotubes in Alcohols and Applicability toward Carbon Nanotube/Sol-Gel Composite Formation, Langmuir 2005, 21, 1055-1061)

(3) Tank-type ultrasonic oscillator: the CNT/water dispersion can last only 5 minutes. (Yangchuan Xing, Liang Li, Charles C. Chusuei, and Robert V. Hull, Sonochemical Oxidation of Multiwalled Carbon Nanotubes, Langmuir 2005, 21, 4185-4190)

(4) Porphyrin: time for lasting the dispersion is not mentioned. (Jinyu Chen and C. Patrick Collier Noncovalent Functionalization of Single-Walled Carbon Nanotubes with Water-Soluble Porphyrins, J. Phys. Chem. B, Vol. 109, No. 16, 2005 7605-7609)

(5) Reductive metal such as Li and Na: the dispersions of CNT in organic solvents (such as THF, DMF, DMSO) can be quickly achieved but have to be preserved in nitrogen, and Li and Na are uneasily preserved. (Alain Pe'nicaud, Philippe Poulin, Alain Derre', Eric Anglaret and Pierre Petit, Spontaneous Dissolution of a Single-Wall Carbon Nanotube Salt, J. Am. Chem. Soc.; 2005; 127; 8-9)

(6) Ionic aromatic: time for lasting the dispersion is not mentioned, and the ionic aromatic is difficulty synthesized and possibly carcinogenic. (Hanna Paloniemi, Taina Laiho, Hanna Liuke, Natalia Kocharova, Keijo Haapakka, Fabio Terzi, Renato Seeber, and Jukka Lukkari, Water-Soluble Full-Length Single-Wall Carbon Nanotube Polyelectrolytes: Preparation and Characterization, J. Phys. Chem. B 2005, 109, 8634-8642)

According to the above reports, it's desired to develop a technology of dispersing the carbon nanotubes in a solution without the above problems.

SUMMARY OF THE INVENTION

The main object of the present invention is to provide a method for fast dispersing carbon nanotubes (CNTs) in an aqueous solution, so that the carbon nanotubes can be stable and uniform in the aqueous solution for at least two months.

Another object of the present invention is to provide an agent which can calibrate concentration of the carbon nanotubes.

In the present invention, the method for dispersing the carbon nanotubes in an aqueous solution includes steps of: (a) dissolving an anionic surfactant in water to form an aqueous solution of the anionic surfactant; (b) mixing carbon nanotubes in the aqueous solution of the anionic surfactant with high-speed oscillation so as to obtain a CNT dispersion.

The above anionic surfactant can be alkyl sulfonate or benzene sulfonate such as sodium alkyl sulfonate, sodium benzene sulfonate, calcium alkyl sulfonate and calcium benzene sulfonate. The preferred compounds include sodium hexyl sulphonate, sodium heptyl sulphonate, sodium oxtyl sulphonate, sodium dodecyl sulphonate, sodium nonadecyl sulphonate, sodium eicosyl sulphonate, sodium hexyl benzene sulphonate, sodium heptyl benzene sulphonate, sodium oxtyl benzene sulphonate, sodium dodecyl benzene sulphonate, sodium nonadecyl benzene sulphonate, sodium eicosyl benzene sulphonate, calcium hexyl sulphonate, calcium heptyl sulphonate, calcium oxtyl sulphonate, calcium dodecyl sulphonate, calcium nonadecyl sulphonate and calcium eicosyl sulphonate.

For sodium dodecyl sulphonate (SDS) as the surfactant, preferred concentration thereof will be 1~0.1 wt % in the aqueous solution; and a preferred weight ratio of SDS: CNT will be 1:1~100:1, more preferably 4:1~40:1.

In the above step (b), the oscillator is preferably operated at about 25° C., for about 1~20 minutes, and with an intermittent mode to preserve the structure of the carbon nanotubes. The oscillator is preferably a probe-type ultrasonic oscillator, and power and frequency thereof preferably respectively ranges 150~300 W and 20~40 KHz.

DETAILED DESCRIPTION OF THE PREFERRED EMBODIMENTS

Figure 1:
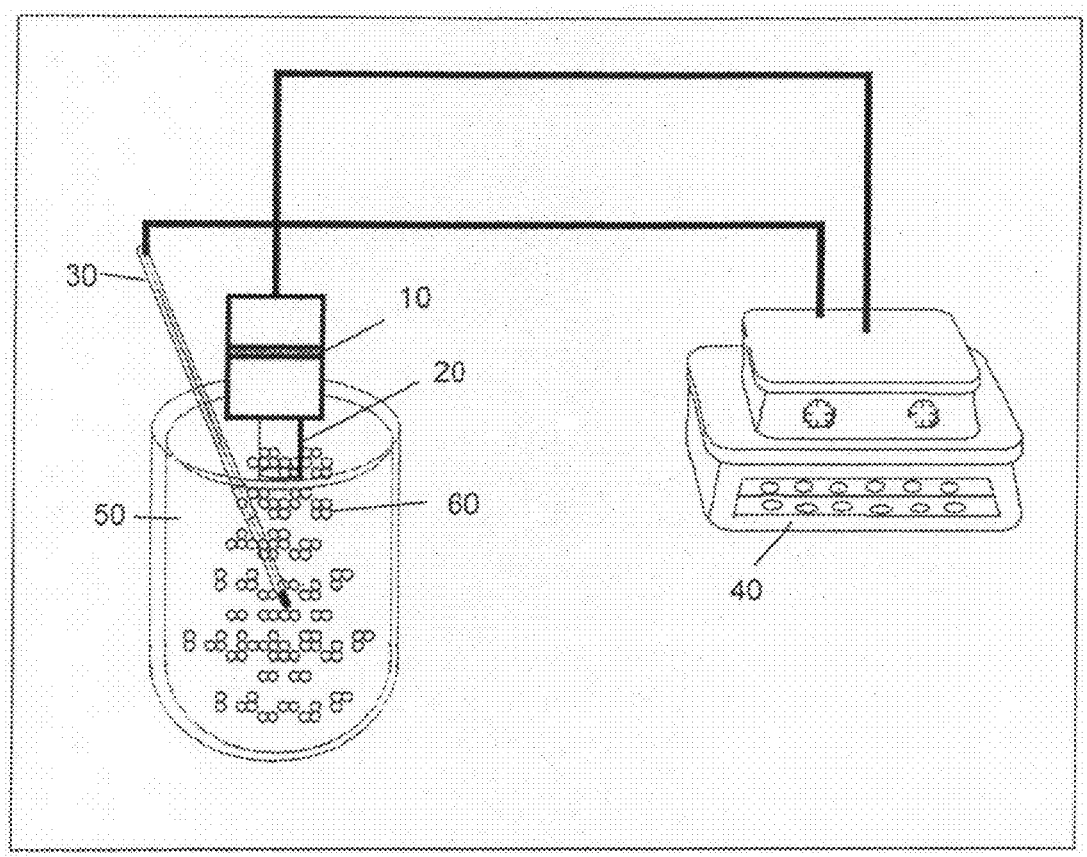
FIG. 1 shows die probe-type ultrasonic oscillator used in the embodiments.

To clearly describe the present invention, procedures of some preferred embodiments are exemplified with the drawings. FIG. 1 shows a probe-type ultrasonic oscillator for mixing CNT, a surfactant and polymers, which includes an oscillator 10, a Ti probe 20, a controller 30 and a thermocouple 40. Once the oscillator starts, the solution 50 will generate bubbles 60.

In the Examples and Comparative Examples, Sodium dodecyl sulphonate (SDS) is used as the surfactant.

Example 1

SDS (500 mg) is dissolved in water to form an aqueous solution (50 mL) and then added into a round-bottom tube in which CNT (12.5 mg) is contained. These materials are then mixed with a probe-type ultrasonic oscillator for 1~20 minutes to form a CNT dispersion. Operation conditions of the oscillator are as follows:
Frequency: 20 KHz
rated power: 750 W
operation strength: 20%-40%
temperature: 25° C.
The mixture is then cooled to room temperature and a uniform CNT dispersion is achieved.

Example 2

The procedures in Example 1 are repeated, but a different amount of SDS (250 mg) is added.

Example 3

The procedures in Example 1 are repeated, but a different amount of SDS (50 mg) is added.

Example 4

The procedures in Example 1 are repeated, but a different amount of CNT (50 mg) is added.

Example 5

The procedures in Example 1 are repeated, but a different amount of CNT (100 mg) is added.

Comparative Example 1

The procedures in Example 1 are repeated, but no SDS is added.

Comparative Example 2

The procedures in Example 1 are repeated, but a different amount of CNT (250 mg) is added.

Comparative Example 3

The procedures in Example 1 are repeated, but the ultrasonic oscillator is replaced with Langmuir ultrasonic oscillator as mentioned in the prior art.

Table 1 lists the components and their concentrations of the above Examples 1~5 and Comparative Examples 1~2.

TABLE 1

| Example/Comparative Example | CNT (mg/ml) | SDS (mg/ml) | CNT:SDS (mg/mg) |
| --- | --- | --- | --- |
| Example 1 | 0.25 | 10 | 1:40 |
| Example 2 | 0.25 | 5 | 1:20 |
| Example 3 | 0.25 | 2.5 | 1:10 |
| Example 4 | 1.00 | 10 | 1:10 |
| Example 5 | 2.00 | 10 | 1:5 |
| Comparative Example 1 | 0.25 | 0 | — |
| Comparative Example 2 | 5.00 | 10 | 1:2 |

Figure 2:
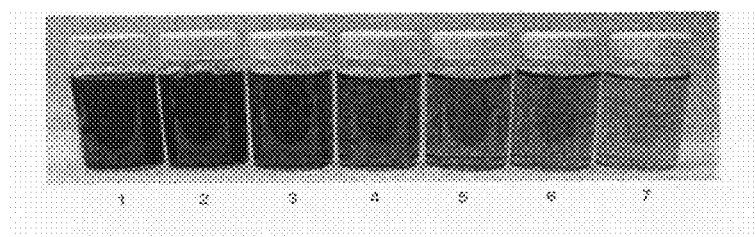
FIG. 2 shows the dispersion obtained in Example 1 and its dilutions.

To verify that the CNT in accordance with the present invention is completely dispersed, the dispersion obtained in Example 1 and its dilutions in concentrations 1/10, 1/20, 1/30, 1/40, 1/50 and 1/100 are shown in FIG. 2 (respectively marked as No. 1~7). As a result, no aggregate of CNT is observed.

The aqueous solutions containing CNT obtained in the above Examples and Comparative Examples are also left statically for 48 hours and then diluted. As a result, the aqueous solutions of Examples 1~5 remain uniform states, but those of Comparative Examples 1~3 are not uniform any longer.

Figure 3:
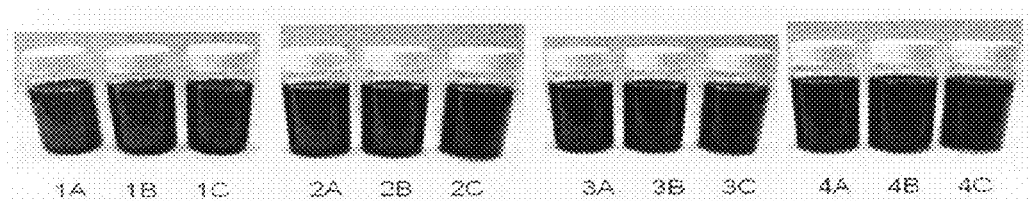
FIG. 3 shows the CNT dispersions of Examples 1~3.

FIG. 3 shows the CNT dispersions of Examples 1~3 (respectively marked as A, B, C), all of which are left statically for 1 day, 1 week, 1 month and 45 days (respectively marked as No. 1~4). As shown in FIG. 3, the CNT dispersion in accordance with the present invention can still remain well dispersing after 45 days and no precipitate and aggregate is observed. That is, the CNT can be dispersed in an aqueous SDS solution through proper oscillation.

Figure 4:
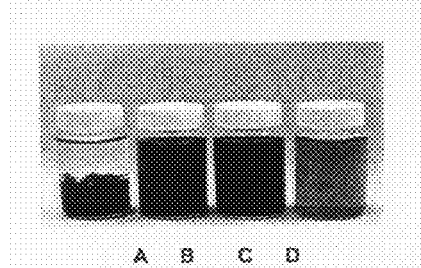
FIG. 4 compares states of different CNT aqueous solutions.

FIG. 4 compares states of different CNT aqueous solutions, in which "A" shows the CNT settling from the aqueous solution of Comparative Example 3 after left statically for 30 minutes; "B" shows the CNT dispersion of Example 4 after left for 30 minutes; "C" show the CNT dispersion of Example 5 after left for 3 months; and "D" shows a 1/40 dilution of CNT dispersion in "C" which is still well dispersed.

Figure 5:
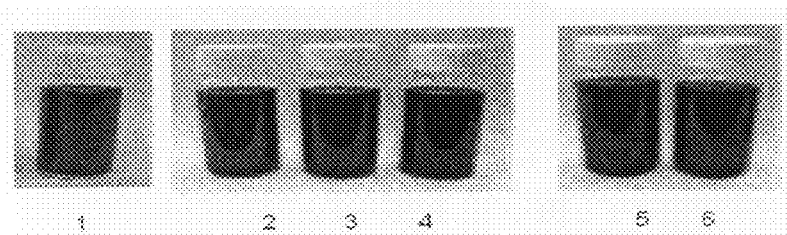
FIG. 5 compares states of the CNT dispersions mixed with DMF and ethanol.

FIG. 5 compares states of the CNT solutions obtained in Example 1, in which dimethylformamide (DMF) and ethanol are added and left for one week. In FIG. 5, No. 1~3 respectively indicate the CNT solutions in which the ratios of $H_2O$:DMF are 0:1, 5:1 and 1:1; and No. 5~6 respectively indicate the CNT solutions in which the ratios of $H_2O$: ethanol are 5:1 and 2:1. As shown in FIG. 5, even though a high polar solvent is added, the CNT dispersion of the present invention can still remain uniform and stable as well after one week. This feature will facilitate further applications of CNTs due to high compatibility thereof.

Figure 6:
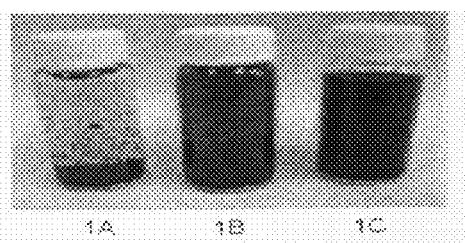
FIG. 6 compares states of the CNT aqueous solutions obtained in Example 1 and Comparative Examples 1 and 2.

FIG. 6 compares states of the CNT solutions obtained in Example 1 (No. 1C), Comparative Example 1 (No. 1B) and Comparative Example 2 (No. 1A). Apparently, the CNT of Comparative Example 2 which uses a tank-type ultrasonic oscillator settles on the bottom though SDS is added. Most CNT of Comparative Example 1 also settles on the bottom as no sodium dodecyl sulphonate is added. Contrarily, the CNT of Example 1 well disperses in the aqueous solution.

In addition to the above observations and comparisons, more analyses are achieved to construct modes about CNT dispersion and structures.

TEM Analysis

Figure 7:
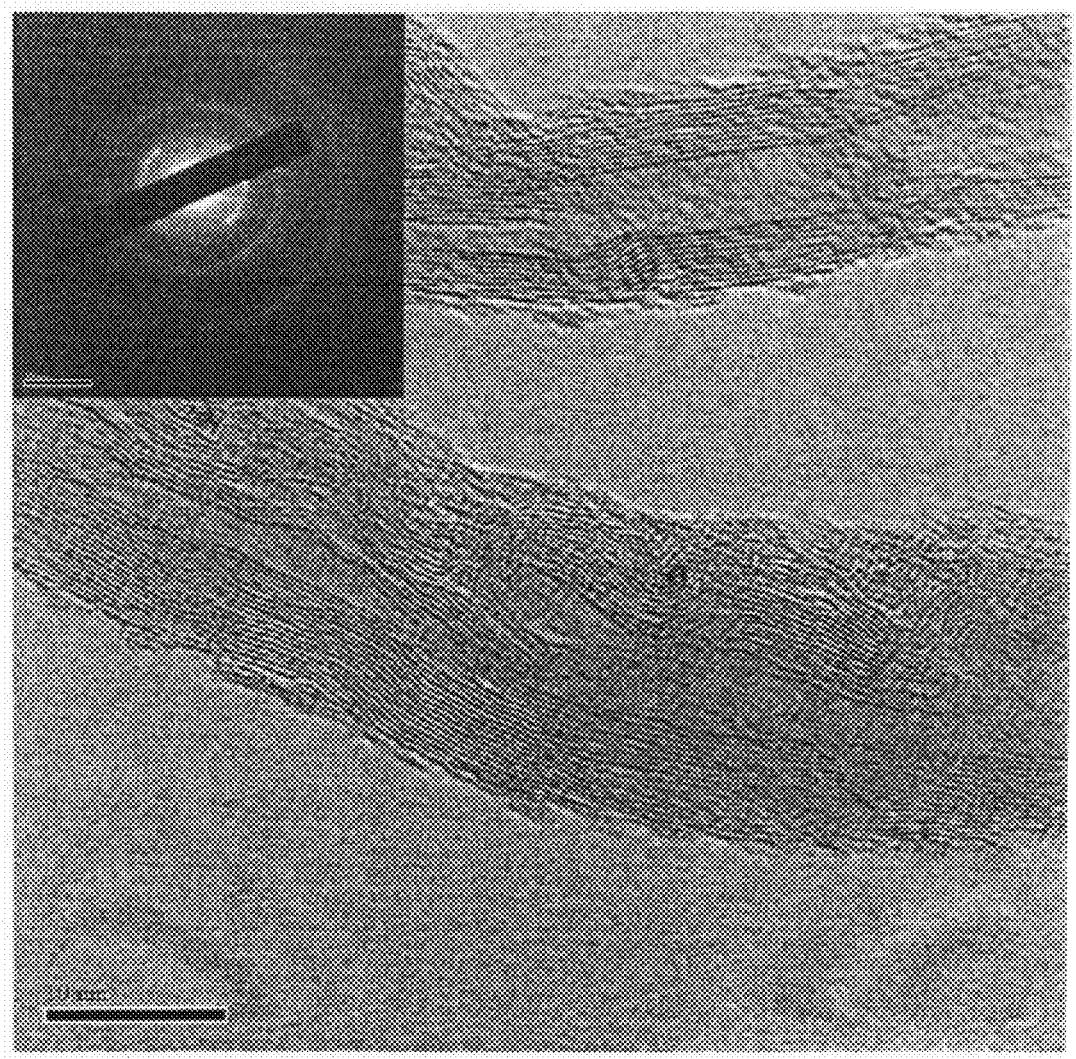
FIG. 7 shows the TEM picture of the carbon nanotubes obtained in Example 1.

FIG. 7 shows the TEM picture of the CNT obtained in Example 1, which indicates: (1) the CNT has a diameter about 20~30 nm; (2) the CNT has a complete crystal structure; and (3) a layer of surfactant adsorbs on the CNT.

AFM Analysis

Figure 8:
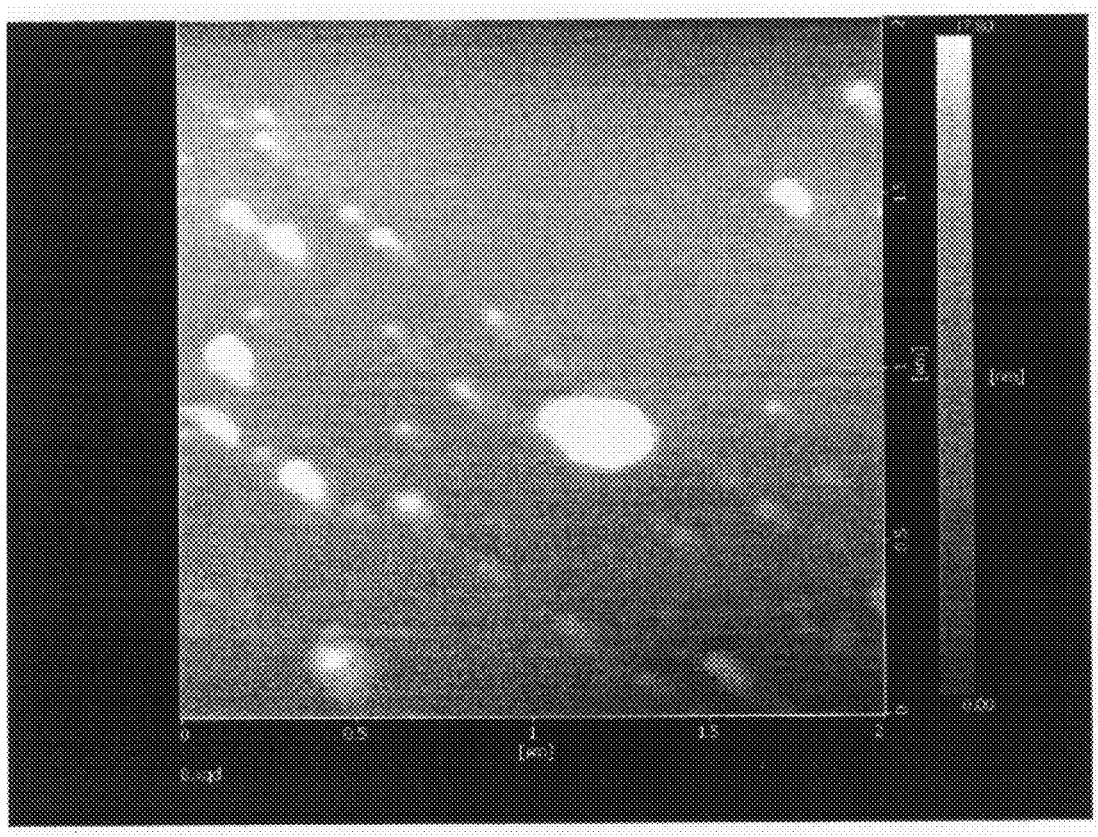
FIG. 8 shows the AFM picture of the carbon nanotubes obtained in Example 1.

FIG. 8 shows the AFM picture of the CNT obtained in Example 1, which indicates: (1) the CNT separates and well dispersed in parallel; and (2) the CNT has a diameter about 20~30 nm as observed in the TEM picture. These results may imply feasible "network alignment" of the CNT and thus create applications to, for example, transparent electrodes, transparent conductive films instead of ITO in semiconductor devices, and wires.

TGA Analysis

Figure 9:
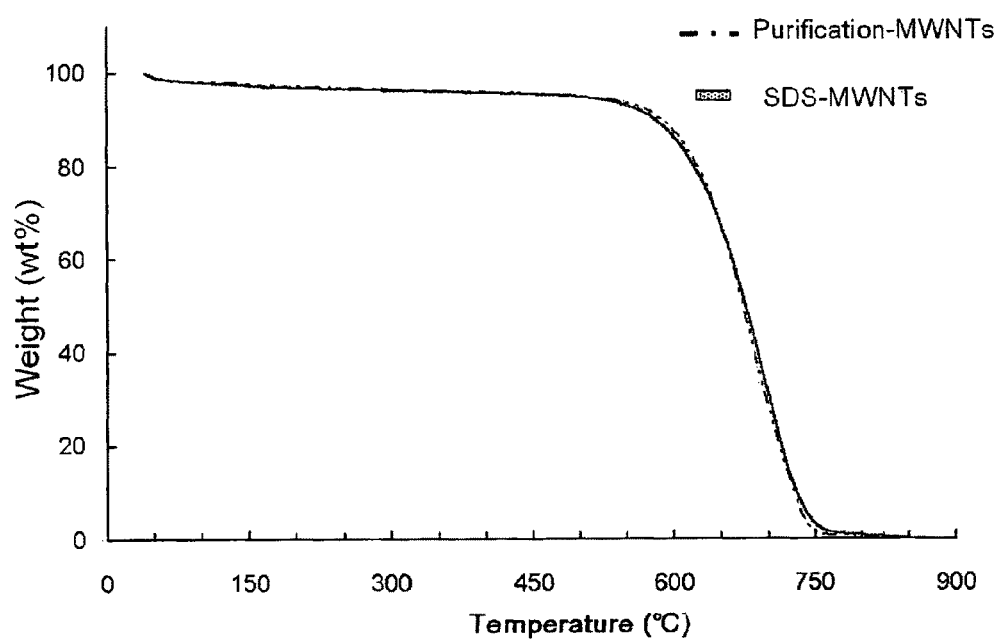
FIG. 9 shows the TGA curve of the carbon nanotubes obtained in Example 1.

FIG. 9 shows the TGA curve of the CNT obtained in Example 1 which is previously washed through a filter membrane to remove the surfactant and analyzed in a temperature gradient 5° C./min. As shown in FIG. 9, the curve of Example 1 (SDS-MWNTs) is the same as that of purified CNT (Purification-MWNTs); which indicates: (1) the structure of the CNT is not destroyed; (2) the surfactant can be completely removed by washing and thus the CNT can be easily applied to various processes.

UV Spectrum Analysis

Figure 10:
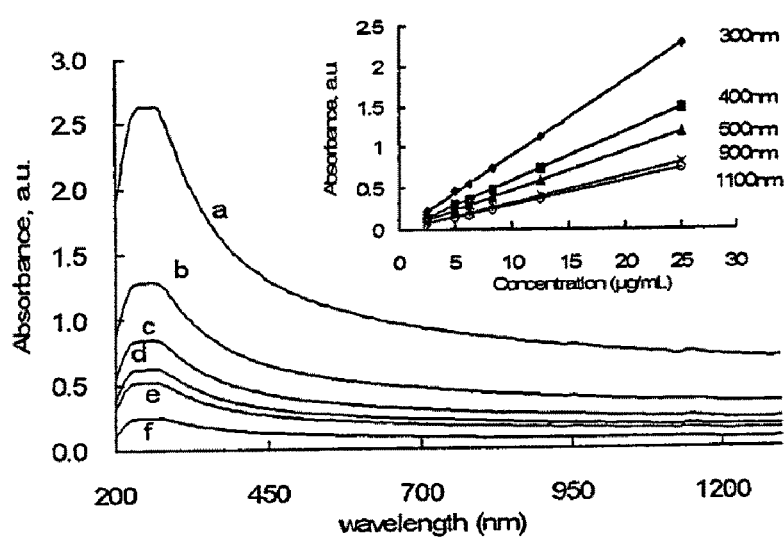
FIG. 10 shows relationships of UV absorbance and concentrations of the CNT solution obtained in Example 1.

FIG. 10 shows relationships of UV absorbance and concentrations of the CNT solution obtained in Example 1 which is diluted to 10 times, 20 times, 30 times, 40 times, 50 times and 100 times volumes (corresponding to curves a~f). So far, the CNT obtained by conventional procedures can perform linear relationship only at 300 nm, 500 nm and 450 nm. However, the CNT of the present invention can exhibit superior linearity (R=0.9999) in a wide range of wavelength.

Figure 11A:
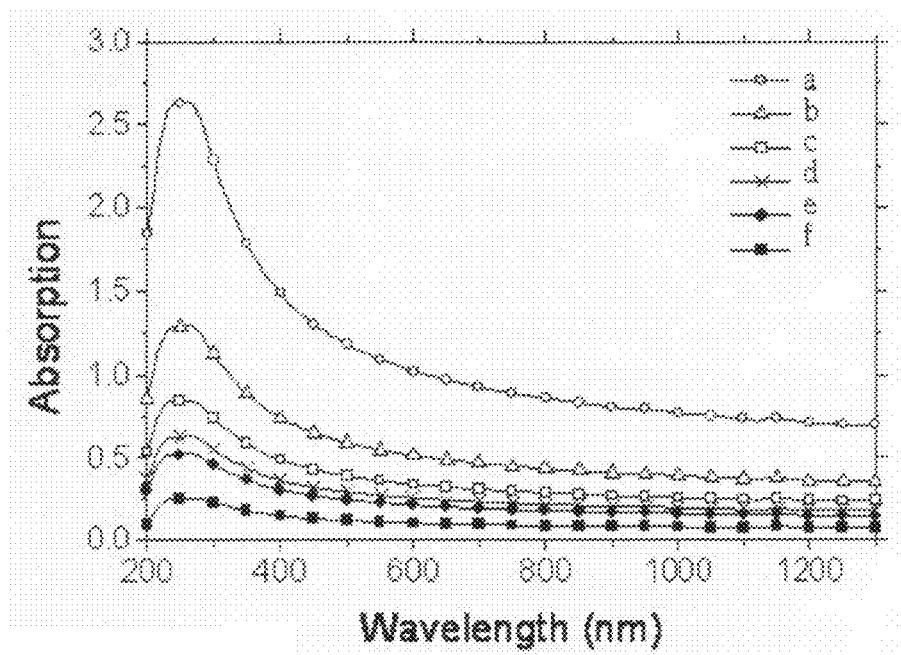
FIG. 11 compares UV absorbance of these dilutions before and after left for four weeks.
Figure 11B:
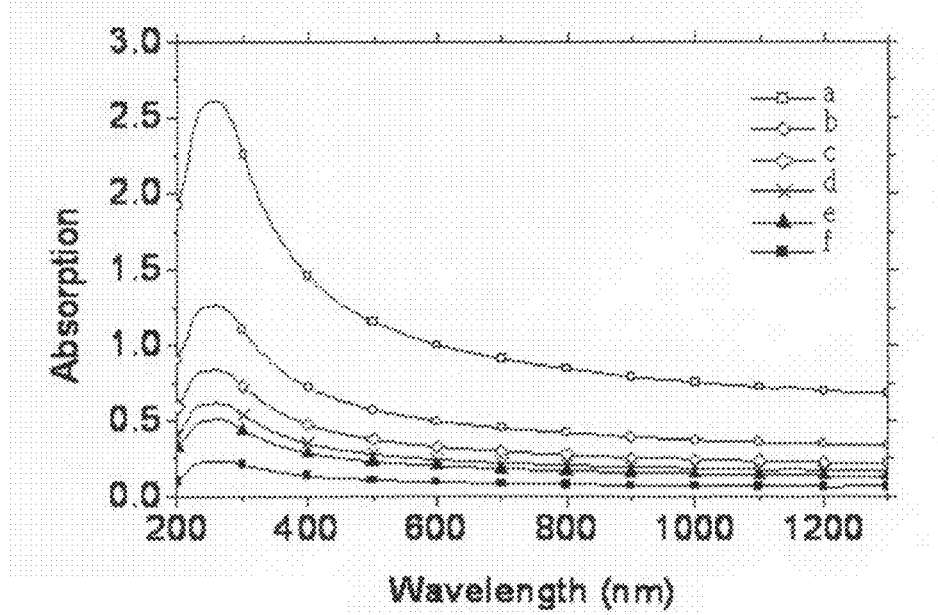

As shown in the above analyses, the CNT dispersion obtained in accordance with the present invention performs good linear relationship between UV absorbance and concentrations and is stable enough to serve as a standard agent for calibrating concentrations of CNT. FIG. 11 compares UV absorbance of these dilutions before and after left for four weeks, and the curves are almost overlapped.

The CNT dispersion obtained in accordance with the present invention indeed performs high stability for a long term, uniform dispersion and good compatibility with other organic solvents. The probe-type ultrasonic oscillator can well disperse the CNT in water in which a proper anionic surfactant is contained. Ultrasonic oscillation may powerfully agitate the CNT into a separate state and remove amorphous carbon from the surfaces, so that SDS can effectively disperse the CNT. The CNT dispersion is therefore suitable for polymer composites, network transparent CNT electrodes, and sensors of CNT.

What is claimed is:

1. A method for producing a CNT (carbon nanotube) dispersion, comprising steps of:
   (a) dissolving sodium dodecyl sulfate (SDS) in water to form an aqueous solution of SDS; and
   (b) mixing CNT in the aqueous solution of SDS with a probe-type ultrasonic oscillator to obtain the standard agent of CNT;
   wherein:
   the SDS has a concentration about 1 wt % in the aqueous solution;
   the weight ratio of SDS: CNT is 40:1;
   the probe-type ultrasonic oscillator is operated intermittently; and
   the CNT dispersion can be diluted to have a linear correlation coefficient about 0.9999 ranging from 2.5 µg/mL to 250 µg/mL.

2. The method of claim 1, wherein the step (b) is operated at about 25 degree C.

3. The method of claim 2, wherein the step (b) is operated for about 1 to 20 minutes.

4. The method of claim 1, wherein the ultrasonic oscillator has power about 150 to 300 W.

5. The method of claim 1, wherein the ultrasonic oscillator has a frequency about 20 to 40 KHz.

6. A standard agent for calibrating concentrations of CNT (carbon nanotube), comprising a product obtained by mixing CNT in an aqueous solution of sodium dodecyl sulfate (SDS) with a probe-type ultrasonic oscillator;
   wherein:
   the SDS has a concentration about 1 wt % in the aqueous solution;
   the weight ratio of SDS: CNT is 40:1;
   the probe-type ultrasonic oscillator is operated intermittently; and
   the standard agent can be diluted to have a linear correlation coefficient about 0.9999 ranging from 2.5 µg/mL to 250 µg/mL.

* * * * *